(12) United States Patent
Faria et al.

(10) Patent No.: US 6,295,216 B1
(45) Date of Patent: Sep. 25, 2001

(54) POWER SUPPLY APPARATUS WITH SELECTIVE RECTIFIER HARMONIC INPUT CURRENT SUPPRESSION AND METHODS OF OPERATION THEREOF

(75) Inventors: Des Faria; Hong Zhang; Piotr Grudzinski; Edward Akbari, all of Ontario (CA)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/543,814

(22) Filed: Apr. 6, 2000

(51) Int. Cl.$^7$ ...................................................... H02M 1/12
(52) U.S. Cl. ............................................. 363/44; 307/105
(58) Field of Search ................................... 363/39, 80, 44, 363/46, 89, 97, 126, 131; 323/205, 207; 307/105, 43–46, 64, 66

(56) References Cited

U.S. PATENT DOCUMENTS

| | | | |
|---|---|---|---|
| 3,896,348 | | 7/1975 | Loderer ................................. 318/227 |
| 5,047,909 | * | 9/1991 | Hosoda ................................... 363/40 |
| 5,430,364 | | 7/1995 | Gibson ................................. 323/207 |
| 5,499,178 | * | 3/1996 | Mohan ..................................... 363/39 |
| 5,867,379 | * | 2/1999 | Maksimovic et al. ................. 363/89 |
| 6,038,151 | * | 3/2000 | Jiang et al. ............................. 363/89 |
| 6,049,473 | * | 4/2000 | Jang et al. .............................. 363/89 |

* cited by examiner

*Primary Examiner*—Peter S. Wong
*Assistant Examiner*—Gary L. Laxton
(74) *Attorney, Agent, or Firm*—Myers Bigel Sibley & Sajovec

(57) ABSTRACT

A power supply apparatus includes an AC input port and a rectifier circuit, coupled to the AC input port, that produces a DC voltage at a rectifier circuit output from an AC input voltage at the AC input port. The apparatus further includes a selective harmonic current inducing circuit, coupled to the rectifier circuit output, that induces a harmonic component in a current delivered to a load from the rectifier circuit output. The selective harmonic current inducing circuit may control a phase and a magnitude of the induced harmonic current component in order to achieve selective suppression of a harmonic input current at the AC input port. The power supply apparatus may further include a filter circuit, coupled to the AC input port, that selectively suppresses a first harmonic current at the AC input port. The selective harmonic current inducing circuit may control the phase and magnitude of the induced harmonic current component such that a second harmonic current at the AC input port is suppressed. For example, for a three-phase passive rectifier circuit, the filter circuit may suppress a fifth harmonic input current, and the selective harmonic current inducing circuit may control the phase and magnitude of an induced sixth harmonic current component such that a seventh harmonic input current at the AC input port is suppressed. Related methods are also discussed.

61 Claims, 7 Drawing Sheets

POWER SUPPLY APPARATUS WITH SELECTIVE RECTIFIER HARMONIC INPUT CURRENT SUPPRESSION AND METHODS OF OPERATION THEREOF

BACKGROUND OF THE INVENTION

The present invention relates to power supply apparatus and methods of operation thereof, and more particular, to rectifier circuits and methods.

Rectifier circuits are commonly used in power supply apparatus, such as uninterrupted (or "uninterruptible") power supplies (UPSs), motor drives, and the like, to produce a DC voltage from an AC input voltage provided from an AC power source, such as a utility line. For example, in online UPS applications, a passive rectifier may be used to generate a DC voltage from a utility AC voltage, with the DC voltage being regulated and transformed back into an AC output voltage to provide a clean, regulated source of AC power for devices such as computers or telecommunications equipment.

One problem often associated with the use of passive rectifier circuits is the generation of undesirable levels of current harmonics at the AC input of the rectifier, i.e., currents having frequencies that are multiples of the fundamental frequency of the AC input voltage. For example, a typical passive three-phase rectifier circuit may generate high levels of fifth, seventh and higher order odd harmonics. The generation of such harmonics has become the subject of increasing concern, as these harmonic currents can result in the need for increased current carrying capability in the AC system.

Techniques have been proposed for reducing the magnitude of such harmonic currents. These techniques include the use of passive or active filters that are coupled to the input of the rectifier and which suppress the harmonic currents generated at the rectifier input. The generation of harmonics may also be reduced by using active rectification circuits, for example, switched rectifier circuits that can be controlled to reduce the magnitude of harmonic currents at the rectifier input.

Although these techniques can be successful in reducing harmonics, they can have various disadvantages. Passive filters typically are frequency selective, i.e., only suppress a selected harmonic. Consequently, multiple passive filter circuit may be needed to suppress multiple harmonics. Active filtering and rectification schemes may require complex switching networks and associated control electronics.

SUMMARY OF THE INVENTION

According to embodiments of the invention, improved control of harmonic input currents generated at the input of a rectifier circuit may be achieved by using a selective harmonic current inducing circuit that induces a harmonic component in current delivered to a load coupled to the rectifier circuit output. Preferably, the phase and magnitude of the induced harmonic current is controlled to suppress a selected harmonic current at the rectifier input. For example, a sixth harmonic current may be injected into a DC current flowing between a passive three-phase rectifier circuit and a load, Such as an inverter or battery charger. The magnitude and phase of the sixth harmonic current may be controlled such that seventh and higher order odd harmonics at the rectifier circuit input are significantly reduced. The injected sixth harmonic current preferably is generated responsive to the AC voltage at the rectifier input. As this technique may increase the magnitude of a fifth harmonic at the rectifier circuit input, a fifth harmonic filter may be coupled to the rectifier input to reduce total harmonic distortion. The harmonic current control capability can be integrated into current or voltage regulation circuits that serve other function in the apparatus. In this manner, a relatively simple and cost effective technique for reducing overall input harmonics may be provided.

In particular, in embodiments of the invention, a power supply apparatus includes an AC input port and a rectifier circuit, coupled to the AC input port, that produces a DC voltage at a rectifier circuit output from an AC input voltage at the AC input port. The apparatus further includes a selective harmonic current inducing circuit, coupled to the rectifier circuit output, that induces a harmonic component in a current delivered to a load from the rectifier circuit output. The selective harmonic current inducing circuit may control a phase and a magnitude of the induced harmonic current component in order to achieve selective suppression of a harmonic input current at the AC input port.

According to other embodiments of the invention, the power supply apparatus further includes a filter circuit, coupled to the AC input port, that selectively suppresses a first harmonic current at the AC input port. The selective harmonic current inducing circuit controls the phase and magnitude of the induced harmonic current component such that a second harmonic current at the AC input port is suppressed. For example, for a three-phase passive rectifier circuit, the filter circuit may suppress a fifth harmonic input current, and the selective harmonic current inducing circuit may control the phase and magnitude of an induced sixth harmonic current component such that a seventh harmonic input current at the AC input port is suppressed.

According to other embodiments of the invention, a power supply apparatus includes an AC input port and a rectifier circuit, coupled to the AC input port, that produces a DC voltage at a rectifier circuit output from an AC input voltage at the AC input port. A selective harmonic inducing current regulator circuit, coupled to the rectifier output, regulates a DC component of a current delivered to a load coupled to the rectifier circuit output and selectively induces a harmonic component in the current delivered to the load. The selective harmonic inducing current regulator circuit may control a phase and a magnitude of the induced harmonic current component such that selective suppression of a harmonic input current at the AC input port is achieved.

In embodiments of the invention, the selective harmonic inducing current regulator circuit may comprise a current control circuit that controls the current delivered to the load responsive to a current reference signal. The selective harmonic inducing current regulator circuit may further include a first current reference signal generating circuit that generates a first current reference signal that commands a DC current component for the current delivered to the load. A second current reference signal generating circuit may generate a second current reference signal that commands a harmonic current component for the current delivered to the load. A combining circuit may combine the first and second reference current signals to generate a third current reference signal, which is applied to the current control circuit. The second current reference signal generating circuit may include a reference signal generating circuit, coupled to the AC input port, that generates a reference signal that is synchronized to the AC input voltage, and a phase and magnitude control circuit that generates the second current reference signal from the reference signal.

According to still other embodiments of the invention, a power supply apparatus includes an AC input port and a rectifier circuit, coupled to the AC input port, that produces a DC voltage at a rectifier circuit output from an AC input voltage at the AC input port. A filter circuit is coupled to the AC input port and suppresses a first harmonic current at the AC input port. A selective harmonic inducing current regulator circuit is coupled to the rectifier, regulates a DC component of a current delivered to a load coupled to the rectifier circuit output and selectively induces a harmonic component in the current delivered to the load to thereby suppress a second harmonic current at the AC input port.

According to other embodiments of the invention, an uninterruptible power supply (UPS) apparatus includes an AC input port and a rectifier circuit, coupled to the AC input port, that produces a rectified DC voltage at rectifier circuit output from an AC input voltage at the AC input port. A selective harmonic current inducing voltage regulator circuit, coupled to the rectifier output, processes the rectified DC voltage to produce a regulated DC voltage that regulates a DC component of a current delivered by the rectifier circuit, and selectively induces a harmonic component in the delivered current. An inverter circuit, coupled to the to selective harmonic current inducing voltage regulator circuit, produces an AC output voltage from the regulated DC voltage. The selective harmonic current inducing voltage regulator circuit may control a phase and a magnitude of the induced harmonic current component.

In yet other embodiments of the invention, the UPS apparatus further includes a filter circuit, coupled to the AC input port, that selectively suppresses a first harmonic current at the AC input port. The selective harmonic current inducing voltage regulator circuit controls the phase and magnitude of the induced harmonic current component such that a second harmonic current at the AC input port is suppressed. For example, where the rectifier circuit is a three-phase passive rectifier circuit, the selective harmonic current inducing voltage regulator circuit may induce a harmonic current component having a frequency that is a six times a fundamental frequency of the AC input voltage. The selective harmonic current inducing voltage regulator circuit may control the phase and amplitude of the induced harmonic current component such that a harmonic current at the AC input port having a frequency seven times the fundamental frequency is suppressed. The filter may suppress a harmonic current at the AC input port having a frequency five times the fundamental frequency. In this manner, a relatively simple but effective technique for reducing overall harmonic content at the AC input port of the UPS apparatus may be provided.

In method embodiments of the invention, methods of operating a rectifier circuit that produces a DC voltage at a rectifier output from an AC voltage applied to an input of the rectifier circuit are provided. A harmonic component in a current delivered to a load from the rectifier circuit output is selectively induced to suppress a selected harmonic input current at the input of the rectifier. The method may further comprise regulating a DC component of the current delivered to the load. Selective induction of the harmonic component may comprise controlling at least one of the magnitude and phase of the induced harmonic component. According to other method embodiments, a first harmonic current is filtered at the rectifier circuit input. At least one of the magnitude and phase of the induced harmonic component are controlled to suppress a second harmonic current at the rectifier circuit input.

DETAILED DESCRIPTION

Figure 1:
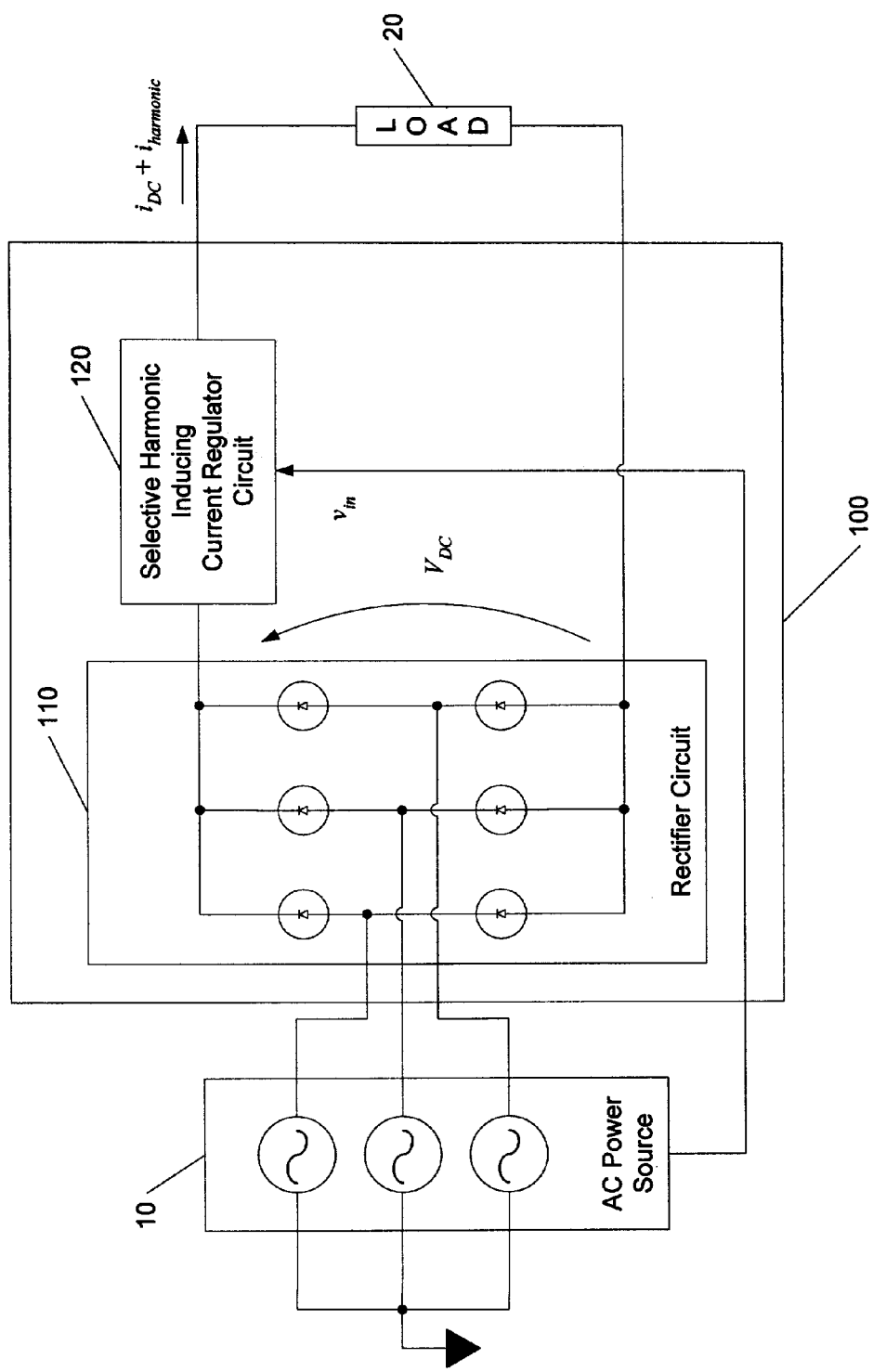
FIG. 1 is a schematic diagram illustrating a power supply apparatus according to embodiments of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The discussion herein relates to apparatus and methods for controlling input harmonic currents for a rectifier circuit, and more particularly, to suppression of selected input harmonic currents. It will be appreciated that harmonic current "suppression" includes attenuating, canceling or otherwise reducing a harmonic current, and includes both total suppression and partial suppression.

FIG. 1 illustrates a power supply apparatus 100 according to embodiments of the invention. The power supply apparatus 100 includes a rectifier circuit 110, here shown as a three-phase diode bridge, configured to couple to an AC power source 10, here shown as a three-phase source. The rectifier circuit 110 is operative to produce a DC voltage $V_{DC}$ from an AC input voltage provided by the AC power source 10. The power supply apparatus 100 further includes a selective harmonic inducing current regulator circuit 120 that regulates a current passing between the rectifier circuit 110 and a load 20, such that a harmonic current $i_{harmonic}$, i.e., a current that varies at a frequency that is a multiple of a fundamental frequency of the AC input voltage supplied by the AC power source, is induced between the rectifier circuit 110 and the load 20. As shown, the selective harmonic inducing current regulator circuit 120 also regulates a DC current $i_{DC}$ passing between the rectifier circuit 110 and the load 20. Preferably, the selective harmonic inducing current regulator circuit 120 is responsive to an input voltage signal $v_{in}$; e.g., the voltage applied to the rectifier circuit 110 or a signal derived therefrom, which the selective harmonic inducing current regulator circuit 120 uses to control timing of the induced harmonic current 120. For example, the input voltage signal $v_{in}$, may comprise one or more of the actual phase voltages produced by the AC power source or some derivative thereof generated via transformer or other signal processing circuitry.

The invention can provide a way to control the distribution of input harmonic currents at the input of a rectifier circuit and, therefore, is applicable to a wide variety of rectifier circuit applications. For example, the load 20 may comprise any of a number of different loads, including, but not limited to, inverter circuits used in uninterruptible power supply (UPS) applications, battery charger circuits used in UPS or other applications, motor drive circuits, and voltage and current regulators used in DC power supplies and other applications. In addtion, the load 20 may comprise, for example, a passive and/or active circuit that serves to carry the harmonic current component, and is connected to another load that is coupled to the rectifier circuit output.

Figure 2:
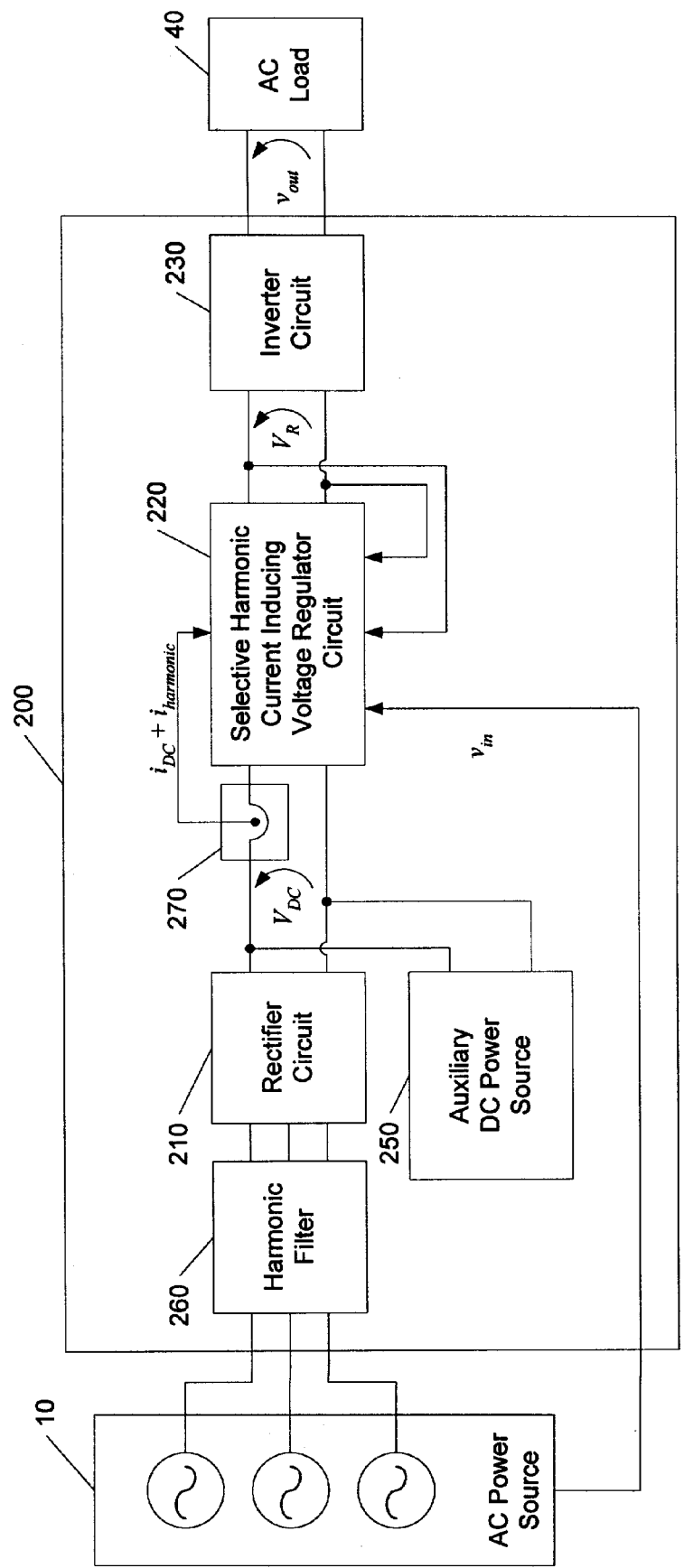
FIG. 2 is a schematic diagram illustrating an uninterruptible power supply (UPS) apparatus according to other embodiments of the invention.

FIG. 2 illustrates an uninterruptible power supply (UPS) apparatus 200 according to other embodiments of the invention. The uninterruptible power supply apparatus 200 includes a rectifier circuit 210 (e.g., a passive three-phase diode rectifier circuit), a selective harmonic current inducing voltage regulator circuit 220, an inverter circuit 230, an auxiliary DC power source 250, and an input harmonic filter 260. The rectifier circuit 210 is coupled to an AC power source 10 and produces a rectified DC voltage $V_{DC}$ at its output. The rectified DC voltage $V_{DC}$ is processed by the selective harmonic current inducing voltage regulator circuit 220 (which may comprise a boost regulator, a buck regulator or some other type of voltage regulator) to produce a regulated DC voltage $V_R$.

The input harmonic filter 260 selectively suppresses a first input harmonic current produced at the input of the rectifier circuit 210. The selective harmonic current inducing voltage regulator circuit 220 controls a DC current component of a current delivered to the inverter circuit 230 by the rectifier circuit 210. The selective harmonic current inducing voltage regulator circuit 220 also induces and controls a harmonic current component of the current delivered to the inverter circuit 230 by the rectifier circuit 210. The selective harmonic current inducing voltage regulator circuit 220 controls the DC and harmonic current components responsive to a current signal $i_{DC}+i_{harmonic}$ (sensed by a current sensor 270), representing the current delivered by the rectifier circuit 210, and to an AC input voltage signal $v_{in}$ from the AC power source 10. Preferably, the selective harmonic current inducing voltage regulator circuit 220 controls the harmonic current such that a second input harmonic current at the input of the rectifier circuit is suppressed.

For example, if the rectifier circuit 210 comprises a three-phase passive diode rectifier circuit, the selective harmonic current inducing voltage regulator circuit 220 may induce and control the magnitude and phase of a sixth harmonic current to suppress a seventh input harmonic current at the input of the rectifier circuit 210. As described below, although this generally results in the amplification of a fifth harmonic input current at the input of the rectifier circuit 210, the input harmonic filter circuit 260 may be designed such that it suppresses this fifth harmonic. Thus, the combination of the action of the selective harmonic current inducing voltage regulator circuit 220 and the input harmonic filter circuit 260 can reduce overall harmonic currents at the input of the rectifier circuit.

The inverter circuit 230 generates an AC output voltage $V_{out}$ that is supplied to an AC load 40. The inverter circuit 230 may comprise any of a variety of conventional inverter circuits, the operations of which are known to those skilled in the art and will not be discussed. The auxiliary DC power source 250 provides an alternative means for maintaining the voltage input into the selective harmonic current inducing voltage regulator circuit 220, and may include, for example, a battery or a combination of a battery and a charging/coupling circuit. Such circuits are known to those skilled in the art, and will not be described in detail herein.

Figure 3:
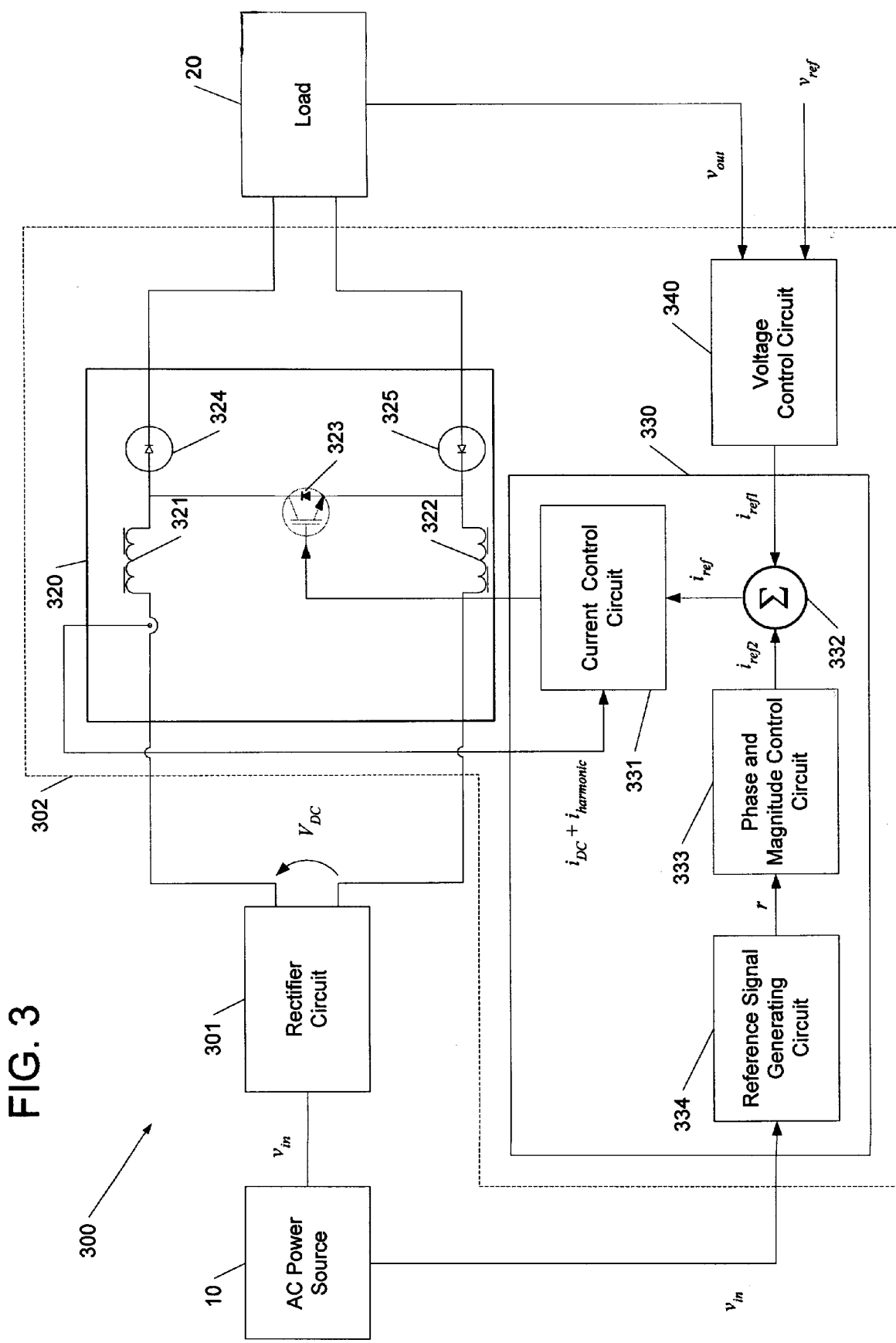
FIG. 3 is a schematic diagram illustrating a power supply apparatus according to still other embodiments of the invention.

It will be appreciated that FIG. 3 is an example of a possible application of the invention, and that the invention is not limited to UPS applications or to voltage regulation applications. For example, instead of compensating for rectifier input harmonics as part of regulating a voltage applied to an inverter, as might be the case in a UPS application, a harmonic current inducing capability (and associated selective input filtering) may be incorporated in, for example, in a current regulation application, such a battery charger circuit that is driven by a DC voltage produced by a rectifier circuit. Other possible applications include incorporation of a harmonic current inducing capability in an input rectified DC power supply.

FIG. 3 illustrates an example of a voltage regulation application according to embodiments of the invention. A power supply apparatus 300 includes a rectifier circuit 301, coupled to an AC power source 10, that produces a rectified DC voltage $V_{DC}$ from an AC input voltage $v_{in}$, and that delivers a current to a load 20, such as an inverter, battery charger, or other apparatus. The power supply apparatus 300 includes a harmonic inducing boost regulator circuit 302 that includes a boost circuit 320 controlled by a selective harmonic inducing current control circuit 330 and a voltage control circuit 340. The boost circuit 320 includes inductors 321, 322 coupled to the rectifier circuit 301. Currents through the inductors 321, 322 are controlled by a switching transistor 323 and diodes 324, 325 such that modulation of the switching transistor 323 can boost a voltage $V_R$ produced by the boost circuit 320.

The selective harmonic inducing current control circuit 330 includes a current control circuit 331 that generates a switching control signal that controls the switching transistor 323. The current control circuit 331 generates the switching control signal responsive to a comparison of a current reference signal (current command) $i_{ref}$ and a sensed current signal $i_{DC}+i_{harmonic}$ representing the current passing between the rectifier circuit 301 and the boost circuit 320. The selective harmonic inducing current control circuit 330 includes a summing circuit 332 that combines a first current reference signal current $i_{ref1}$ generated by the voltage control circuit 340 and a second current reference signal (current command) $i_{ref2}$ produced by a phase and magnitude control circuit 333, thus producing the current reference signal $i_{ref}$. The selective harmonic inducing current control circuit 330 further includes a reference signal generating circuit 334 that provides a reference signal r to the phase and magnitude control circuit 333, which produces the current reference signal $i_{ref2}$ such that it has a desired magnitude and a desired phase with respect to the AC input voltage $v_{in}$. The reference signal generating circuit 334 generates the reference signal r responsive to the AC input voltage $v_{in}$.

It will be appreciated that the harmonic inducing current control circuit 330 and the voltage control circuit 340 may be implemented using a variety of different circuits. Generally, the selective harmonic inducing current control circuit 330 and the voltage control circuit 340 may be implemented using special purpose analog and/or digital hardware, software or firmware operation on a data processing device such as a microcontroller, microprocessor or digital signal processor (DSP), and combinations thereof. The current control circuit 331 may comprise any of a number of different conventional current control circuits, such as hysteresis control circuits, pulse width modulation circuits, and the like. Preferably, the current control circuit 331 has sufficient bandwidth to allow the current control circuit 331 to follow a current reference signal $i_{ref}$ that has a frequency that is several times that of the fundamental frequency of the input voltage $v_{in}$ such that a desired harmonic current can be induced between the rectifier circuit 301 and the load 20. The voltage control circuit 340 may also comprise a variety of different conventional control circuits, including analog and/or digital circuitry. Such voltage control and current control circuits are known to those skilled in the art, and will not be discussed in greater detail.

Figure 4:
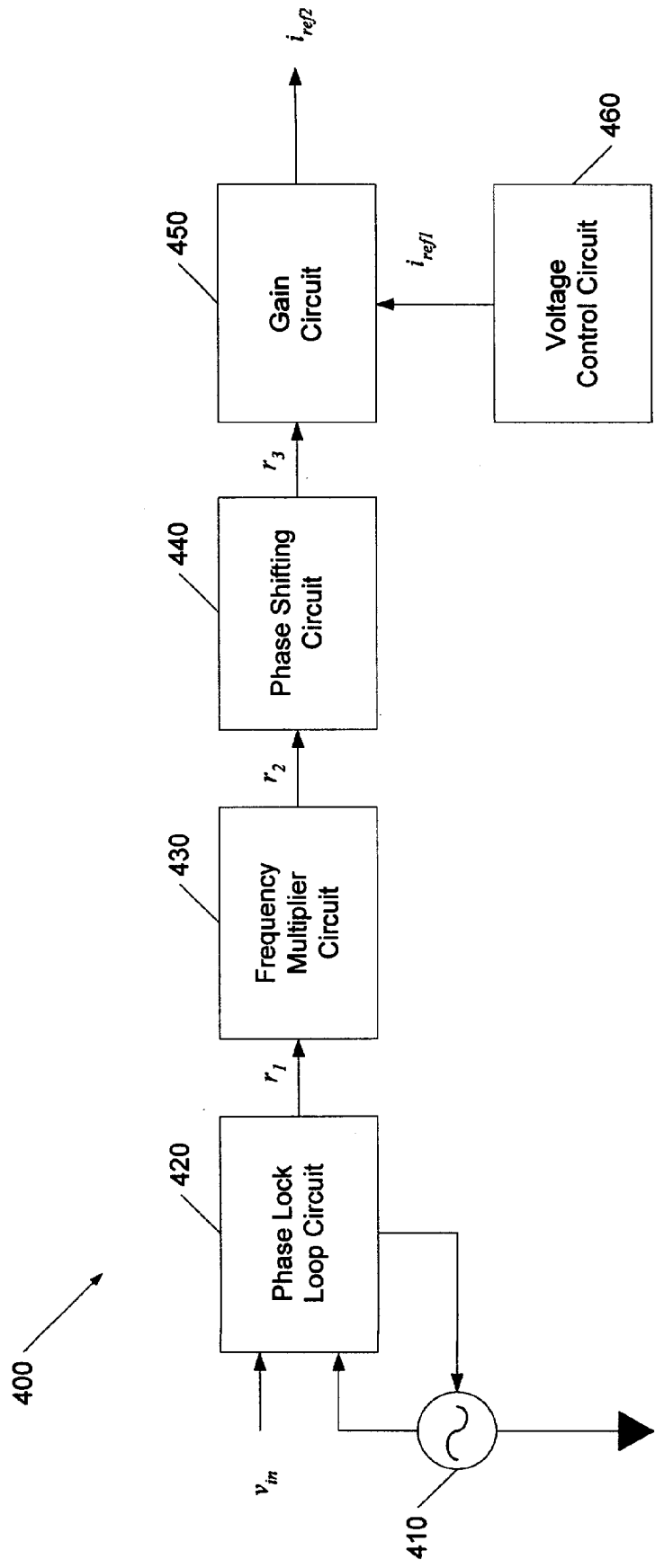
FIG. 4 is a schematic diagram illustrating a reference current signal generating circuit according to embodiments of the invention.

FIG. 4 illustrates an example of a circuit 400 for generating a current reference signal $i_{ref2}$ that may be applied to a current control circuit, such as the current control circuit 331 of FIG. 3. The circuit 400 includes an oscillator 410 that is synchronized to an AC input voltage $v_{in}$(provided to the input of a rectifier circuit (not shown)), by a phase lock loop circuit 420, producing a first reference signal $r_1$. A frequency multiplier circuit 430 produces a second reference signal $r_2$ that has a frequency that is a multiple of the fundamental frequency of the AC input voltage $v_{in}$(e.g., six times the fundamental frequency). A phase shifting circuit 440 processes the second reference signal $r_2$ to produce a third, phase shifted reference signal $r_3$. A variable gain circuit 450 then produces a current reference signal $i_{ref2}$ from the phase shifted third reference signal $r_3$, with the magnitude of the current reference signal being proportional to a current reference signal $i_{ref1}$ produced by a voltage control circuit 460 (which may comprise, for example, the voltage control circuit 340 of FIG. 3).

It will be appreciated that the circuit 400 of FIG. 4 may be implemented using a variety of analog and/or digital circuits, including special purpose circuits, software or firmware executing on processor devices, and combinations thereof. For example, the phase lock loop circuit 420, the frequency multiplier circuit 430, the phase shifting circuit 440 and the variable gain circuit 450 may be implemented in digital fashion using software and/or firmware executing on a microcontroller, DSP or other processor, or using digital devices such as discrete logic gates or a programmable logic device (PLD). Alternatively, one or all of these components may be implemented in analog form, using circuits such as analog frequency multipliers, passive analog filters and active analog filters. It will also be appreciated that the circuit 400 is offered for exemplary purposes, and that a variety of other circuits may be used to generate a suitable current reference signal $i_{ref2}$. For example, circuits using fixed gain and a variable phase shift may be used instead of the circuit 400, as harmonic suppression can be affected by both the magnitude and phase of current injected at a rectifier output, as discussed in detail below.

As discussed above, a particularly advantageous application of the invention is in the control of harmonic currents produced by a three-phase passive diode rectifier circuit. Without compensation, such rectifier circuits typically produce significant fifth, seventh, eleventh and thirteenth harmonic input currents. According to embodiments of the invention, a redistribution of harmonic currents produced at the input of a three-phase passive rectifier may be achieved by injecting a sixth harmonic current component in the output current produced by the passive rectifier circuit. This redistribution of harmonics can be advantageously used with other filtering techniques to provide a relatively simple and cost-effective harmonic reduction technique.

Figure 5:
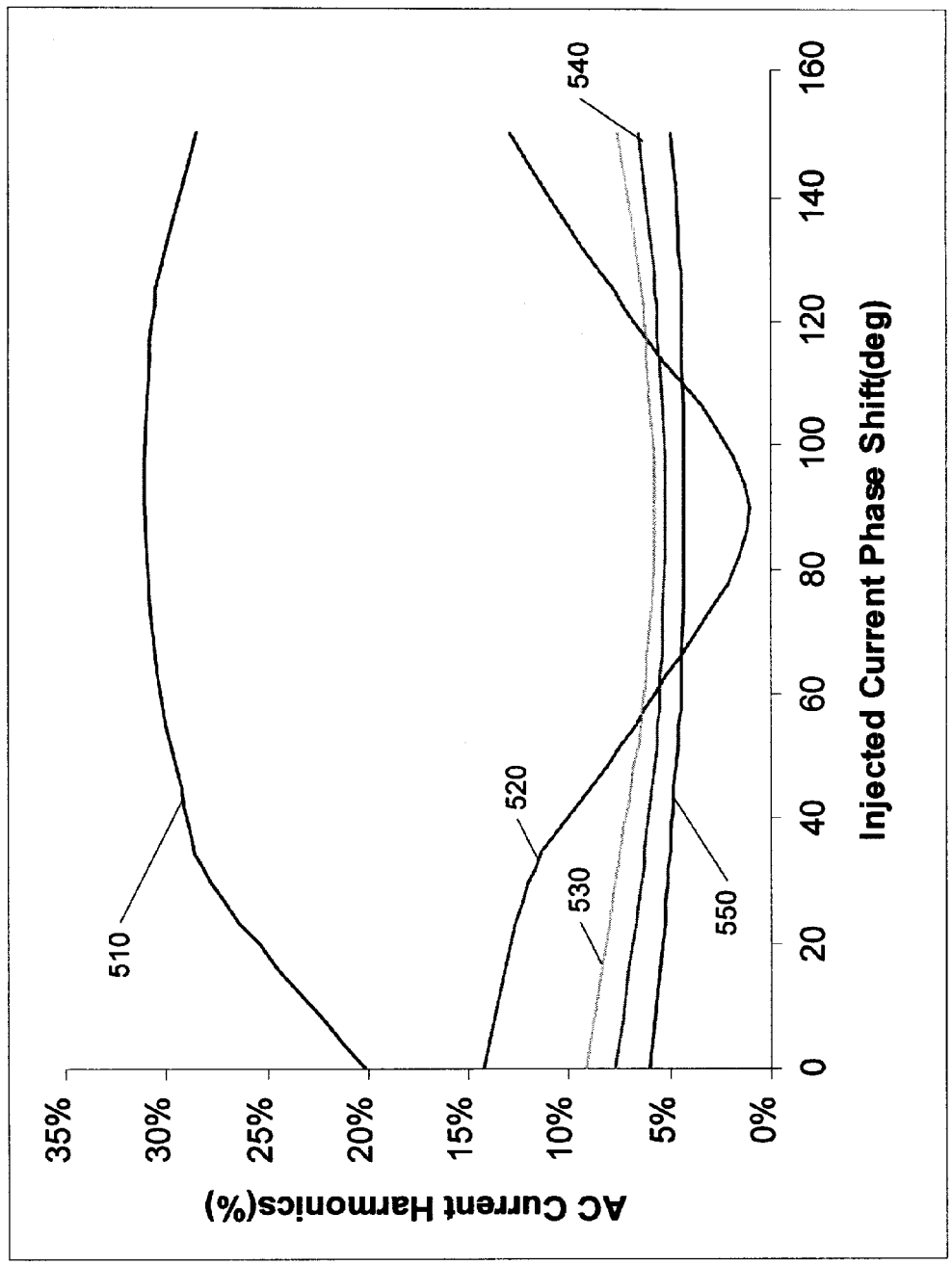
FIGS. 5 and 6 are charts illustrating harmonic current levels in relation to phase shift and magnitude of an injected harmonic current according to embodiments of the invention.

FIG. 5 graphically illustrates the effect of varying the phase of an injected sixth harmonic current having a fixed magnitude on a fifth input harmonic 510, a seventh input harmonic 520, an eleventh input harmonic 530, a thirteenth input harmonic 540, and a seventeenth input harmonic 550 of a passive three-phase diode rectifier circuit. As can be seen from FIG. 5, increasing the phase shift of the injected sixth harmonic current from zero degrees to approximately 90 degrees decreases the seventh, eleventh, thirteenth and seventeenth harmonics 520, 530, 540, 550, but increases the fifth harmonic 510.

Figure 6:
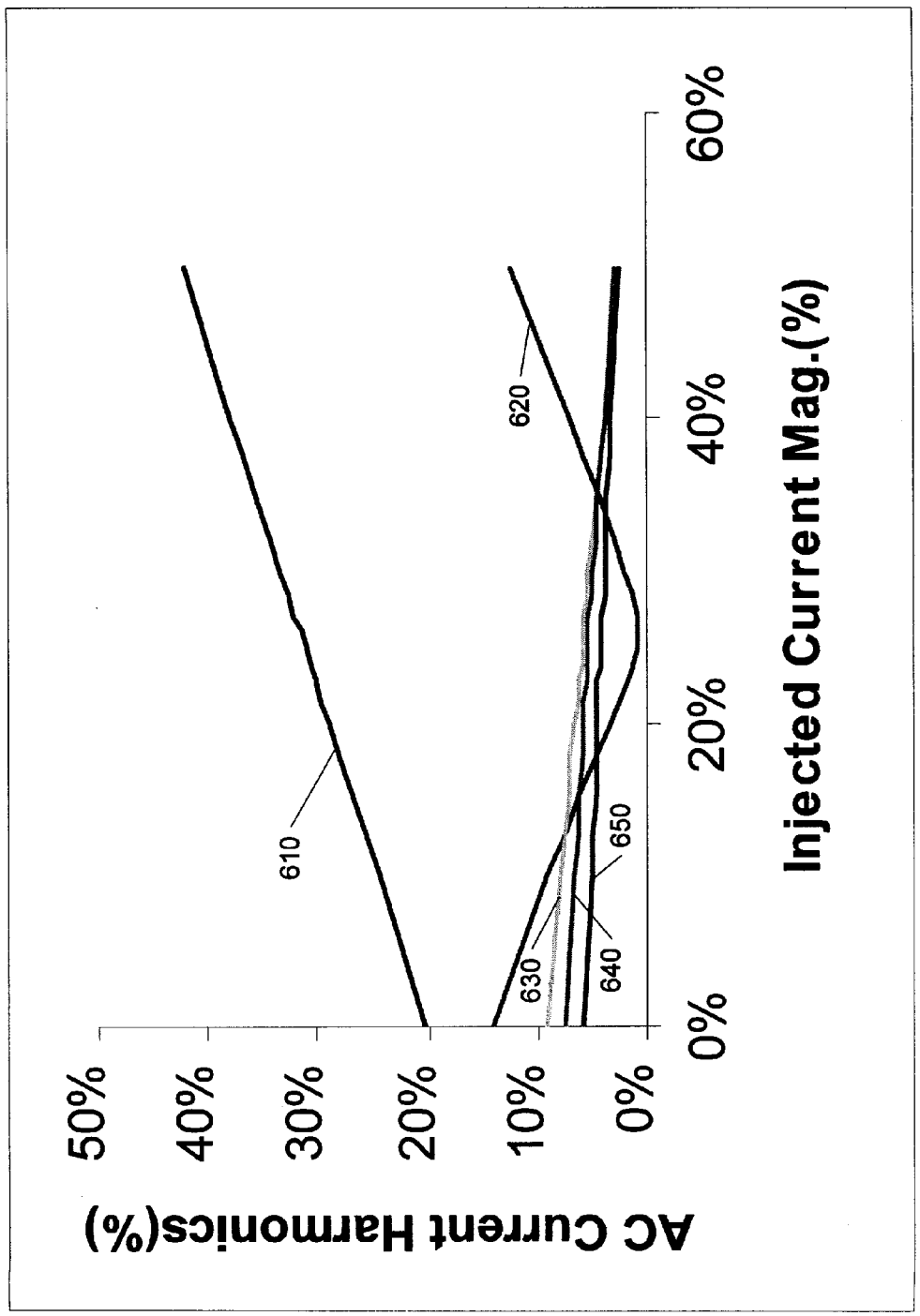

FIG. 6 graphically illustrates the effect of varying the magnitude of an injected sixth harmonic current having a fixed phase on a fifth input harmonic 610, a seventh input harmonic 620, an eleventh input harmonic 630, a thirteenth input harmonic 640, and a seventeenth input harmonic 650 of a passive three-phase diode rectifier circuit. As can be seen from FIG. 6, increasing the magnitude of the injected sixth harmonic current from zero percent to approximately twenty-five percent decreases the seventh, eleventh, thirteenth and seventeenth harmonics 620, 630, 640, 650, but increases the fifth harmonic 610.

As can be seen from FIGS. 5 and 6, varying magnitude and/or phase of the injected sixth harmonic current can reduce selected harmonics, but may not, and generally does not, improve overall harmonics due to the increase in the fifth harmonics 510, 610. However, use of the harmonic current injection techniques described herein in combination with input or other filtering can take advantage of the selective harmonic suppression provided by the harmonic current injection.

Figure 7:
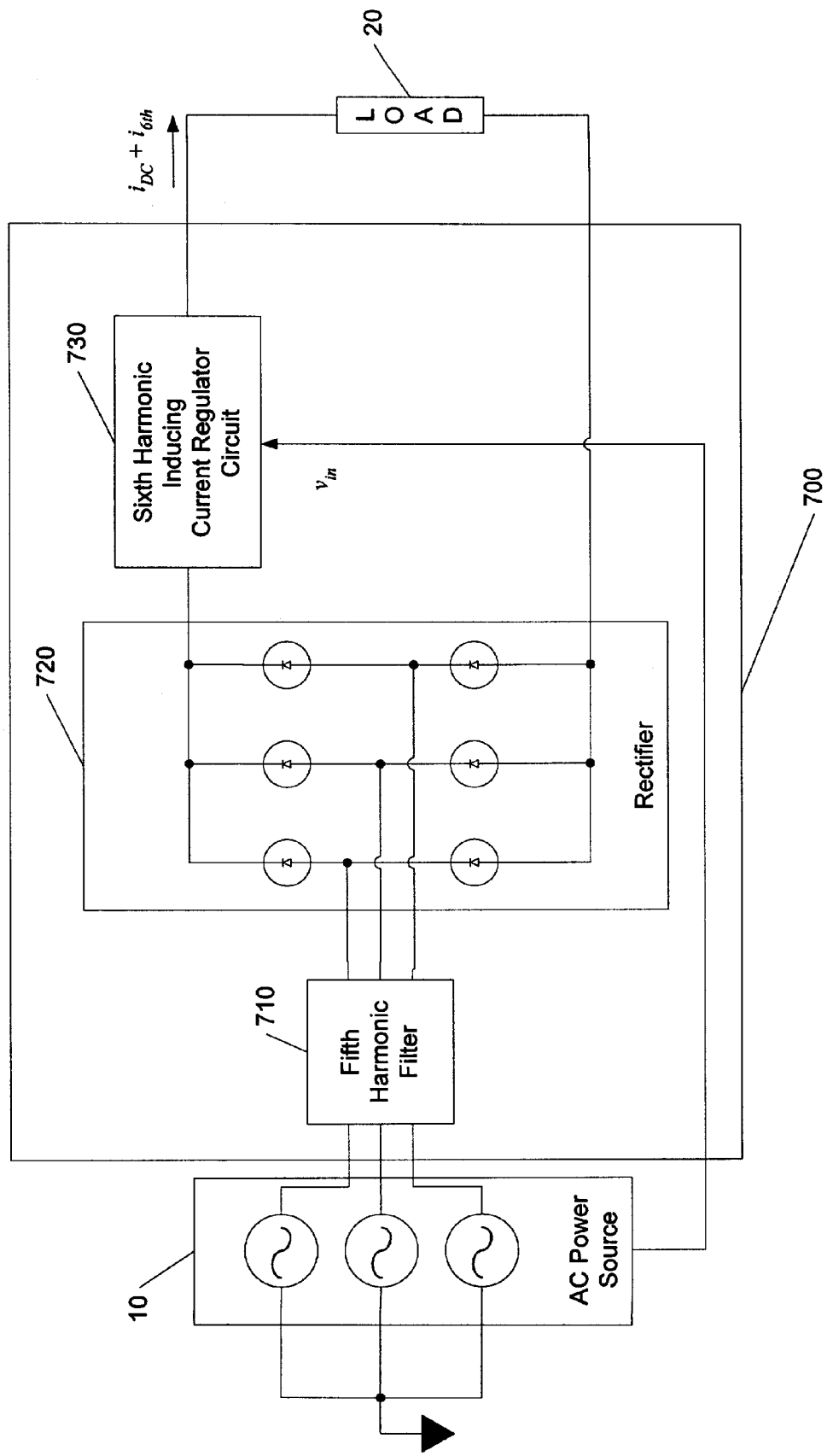
FIG. 7 is a schematic diagram illustrating a power supply apparatus according to yet other embodiments of the invention.

An example of such a technique is illustrated in FIG. 7, which illustrates a power supply apparatus 700 according to yet other embodiments of the invention. The power supply apparatus 700 includes a passive rectifier 720, and a fifth harmonic filter 710 coupled to an AC power source 10. The fifth harmonic filter 710 may comprise, for example, a passive harmonic trap or an active harmonic filter. The power supply apparatus 700 also includes a sixth harmonic inducing current regulator circuit 730 that regulates a DC current $i_{DC}$ delivered to a load 20 and induces a sixth harmonic current $i_{6th}$ therewith responsive to the AC input voltage $v_{in}$, produced by the AC power source 10. The phase shift and magnitude of the induced harmonic current $i_{6th}$ preferably is controlled such that seventh, eleventh, thirteenth and seventeenth harmonic currents at the AC power source 10 are suppressed. Although such an approach may, without further compensation, increase a fifth harmonic current at the AC power source 10, this harmonic current may be suppressed through the action of the fifth harmonic filter 710.

It will be appreciated that the arrangement illustrated in FIG. 7 may be modified within the scope of the invention. For example, although the sixth harmonic inducing current regulating circuit 730 preferably is controlled to maximize suppression of a seventh input harmonic, the sixth harmonic current regulating circuit 730 may be controlled such that a lesser amount of seventh harmonic suppression is achieved, or such that a different harmonic is preferentially suppressed. In such cases, the nature of the input harmonic filter 710 may be changed accordingly to provide a desired level of harmonic suppression. For example, if the sixth harmonic current regulating circuit 730 is controlled such that it suppresses a fifth input harmonic rather than a seventh input harmonic, the input harmonic filter may be designed to suppress a harmonic other than the fifth input harmonic, e.g., to suppress a seventh input harmonic.

It will also be appreciated that the invention is applicable to harmonic input current control for other types of rectifier circuits. For example, the techniques of the present invention may be used with polyphase rectifiers having more than three-phases, such as twelve-pulse rectifiers. In such applications, a different set of input harmonics may be confronted, necessitating the injection of a harmonic current other than the sixth harmonic in order to produce a desired input harmonic spectrum. The invention may also be used with single phase rectifiers, but advantages from such implementations may be limited.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A power supply apparatus, comprising:
   an AC input port;
   a rectifier circuit, coupled to the AC input port, that produces a DC voltage at a rectifier circuit output from an AC input voltage at the AC input port; and
   a selective harmonic current inducing circuit, coupled to the rectifier circuit output, that induces a harmonic component in a current delivered to a load from the rectifier circuit output to suppress a harmonic current at the AC input port without requiring a current bypass between the AC input port and the rectifier circuit output.

2. An apparatus according to claim 1, wherein the selective harmonic current inducing circuit controls a phase and a magnitude of the induced harmonic current component.

3. An apparatus according to claim 2, wherein the selective harmonic current inducing circuit controls the phase and magnitude of the induced harmonic current component such that a selected harmonic current at the AC input port is suppressed.

4. A power supply apparatus, comprising:
   an AC input port;
   a rectifier circuit, coupled to the AC input port, that produces a DC voltage at a rectifier circuit output from an AC input voltage at the AC input port;
   a selective harmonic current inducing circuit, coupled to the rectifier circuit output, that induces a harmonic component in a current delivered to a load from the rectifier circuit output; and
   a filter circuit, coupled to the AC input port, that selectively suppresses a first harmonic current at the AC input port, and wherein the selective harmonic current inducing circuit controls the phase and magnitude of the induced harmonic current component such that a second harmonic current at the AC input port is suppressed.

5. An apparatus according to claim 4, wherein the rectifier circuit comprises a three-phase passive rectifier circuit.

6. An apparatus according to claim 5, wherein the selective harmonic current inducing circuit induces a harmonic current component in the current delivered to the load having frequency that is six times a fundamental frequency of the AC input voltage.

7. An apparatus according to claim 6, wherein the selective harmonic current inducing circuit controls the phase and amplitude of the induced harmonic current component such that a harmonic current at the AC input port having a frequency seven times the fundamental frequency is suppressed.

8. An apparatus according to claim 7, further comprising a fifth harmonic filter that selectively suppresses a harmonic current at the AC input port having a frequency five times the fundamental frequency.

9. An apparatus according to claim 4, wherein the selective harmonic current inducing circuit comprises a current control circuit that controls the current delivered to the load responsive to a current reference signal.

10. An apparatus according to claim 9, wherein the selective harmonic current inducing circuit further comprises a current reference signal generating circuit that generates the current reference signal.

11. A power supply apparatus, comprising:
    an AC input port;
    a rectifier circuit, coupled to the AC input port, that produces a DC voltage at a rectifier circuit output from an AC input voltage at the AC input port; and
    a selective harmonic inducing current regulator circuit, coupled to the rectifier output, that regulates a DC component of a current delivered to a load coupled to the rectifier circuit output and selectively induces a harmonic component in the current delivered to the load to suppress a harmonic current at the AC input port without requiring a current bypass between the AC input port and the rectifier circuit output.

12. An apparatus according to claim 11, wherein the selective harmonic inducing current regulator circuit controls a phase and a magnitude of the induced harmonic current component.

13. An apparatus according to claim 12, wherein the selective harmonic inducing current regulator circuit controls the phase and magnitude of the induced harmonic current component such that a selected harmonic current at the AC input port is suppressed.

14. An apparatus according to claim 11, wherein the selective harmonic inducing current regulator circuit comprises a current control circuit that controls the current delivered to the load responsive to a current reference signal.

15. A power supply apparatus, comprising:
    an AC input port;
    a rectifier circuit, coupled to the AC input port, that produces a DC voltage at a rectifier circuit output from an AC input voltage at the AC input port;
    a selective harmonic inducing current regulator circuit, coupled to the rectifier output, that regulates a DC component of a current delivered to a load coupled to the rectifier circuit output and selectively induces a harmonic component in the current delivered to the load; and
    a filter circuit, coupled to the AC input port, that selectively suppresses a first harmonic current at the AC input port, and wherein the selective harmonic inducing current regulator circuit controls the phase and magnitude of the induced harmonic current component such that a second harmonic current at the AC input port is suppressed.

16. An apparatus according to claim 15, wherein the selective harmonic inducing current regulator circuit comprises a voltage regulator or a battery charger.

17. An apparatus according to claim 15, further comprising a load coupled to the rectifier circuit output, and wherein the load comprises at least one of an inverter and a battery.

18. An apparatus according to claim 15, wherein the selective harmonic inducing current regulator circuit controls the phase and magnitude of the induced harmonic current component such that the first harmonic current is increased.

19. An apparatus according to claim 15, wherein the rectifier circuit comprises a three-phase passive rectifier circuit.

20. An apparatus according to claim 19, wherein the selective harmonic inducing current regulator circuit induces a harmonic circuit induces a harmonic current component in the current delivered to the load having a frequency that is six times fundamental frequency of the AC input voltage.

21. An apparatus according to claim 20, wherein the selective harmonic inducing current regulator circuit controls the phase and amplitude of the induced harmonic current component such that a harmonic current at the AC input port having a frequency seven times the fundamental frequency is suppressed.

22. An apparatus according to claim 21, further comprising a filter that selectively suppresses a harmonic current at the AC input port having a frequency five times the fundamental frequency.

23. An apparatus according to claim 15, wherein the selective harmonic inducing current regulator circuit controls at least one of the phase and the magnitude of the induced harmonic current responsive to a control signal.

24. An apparatus according to claim 15, wherein the selective harmonic inducing current regulator circuit synchronizes the induced harmonic current component to the AC input voltage.

25. A power supply apparatus, comprising:
an AC input port;
a rectifier circuit, coupled to the AC input port, that produces a DC voltage at a rectifier circuit output from an AC input voltage at the AC input port; and
a selective harmonic inducing current delivered to a load coupled to the rectifier circuit output and selectively induces a harmonic component in the current delivered to the load, wherein the selective harmonic inducing current regulator circuit comprises a current control circuit that controls the current delivered to the load responsive to a current reference signal, and wherein the selective harmonic inducing current regulator circuit further comprises:
a first current reference signal generating circuit that generates a first current reference signal that commands a DC current component for the current delivered to the load;
a second current reference signal generating circuit that generates a second current reference signal that commands a harmonic current component for the current delivered to the load; and
a combining circuit that combines the first and second reference current signals to generate a third current reference signal; and wherein the current control circuit is responsive to the third reference current signal.

26. An apparatus according to claim 25, wherein the second current reference signal generating circuit comprises:
a reference signal generating circuit, coupled to the AC input port, that generates a reference signal that is synchronized to the AC input voltage; and
a phase and magnitude control circuit that generates the second current reference signal from the reference signal.

27. An apparatus according to claim 26, wherein the reference signal generator comprises:
a phase locked loop, coupled to the AC input port, that generates a first reference signal that is phase locked to the AC input voltage;
a frequency multiplier that generates a second reference signal from the first reference signal;
a phase shifter circuit that produces a third reference signal from the second reference signal, the third reference signal phase shifted with respect to the second reference signal; and
a variable gain circuit that produces the current reference signal from the third reference signal such that the magnitude of the current reference signal varies responsive to a control signal applied to the variable gain circuit.

28. A power supply apparatus, comprising:
an AC input port;
a rectifier circuit, coupled to the AC input port, that produces a DC voltage at a rectifier circuit output from an AC input voltage at the AC input port;
a filter circuit, coupled to the AC input port, that suppresses a first harmonic current at the AC input port; and
a selective harmonic inducing current regulator circuit, coupled to the rectifier output, that regulates a DC component of a current delivered to a load coupled to the rectifier circuit output and that selectively induces a harmonic component in the current delivered to the load to thereby suppress a second harmonic current at the AC input port.

29. An apparatus according to claim 28, wherein the selective harmonic inducing current regulator circuit controls a phase and a magnitude of the induced harmonic current component.

30. An apparatus according to claim 28, wherein the rectifier circuit comprises a three-phase passive rectifier circuit.

31. An apparatus according to claim 30, wherein the selective harmonic inducing current regulator circuit induces a harmonic current component in the current delivered to the load having a frequency that is six times a fundamental frequency of the AC input voltage.

32. An apparatus according to claim 31, wherein the selective harmonic inducing current regulator circuit controls the phase and amplitude of the induced harmonic current component such that a harmonic current at the AC input port having a frequency seven times the fundamental frequency is suppressed.

33. An apparatus according to claim 32, wherein the filter circuit suppresses a harmonic current at the AC input port having a frequency five times the fundamental frequency.

34. An uninterruptible power supply apparatus, comprising:
an AC input port;
a rectifier circuit, coupled to the AC input port, that produces a rectified DC voltage at a rectifier circuit output from an AC input voltage at the AC input port;
a selective harmonic current inducing voltage regulator circuit, coupled to the rectifier output, that regulates the rectified DC voltage to produce a regulated DC voltage, that regulates a DC component of a current delivered by the rectifier circuit and that selectively induces a harmonic component in the delivered current; and
an inverter circuit, coupled to the selective harmonic current inducing voltage regulator circuit, that produces an AC output voltage from the regulated DC voltage;
wherein the selective harmonic current inducing voltage regulator circuit suppresses a harmonic input current at the AC input port without requiring a current bypass between the AC input port and the rectifier circuit output.

35. An apparatus according to claim 34, wherein the selective harmonic current inducing voltage regulator circuit controls a phase and a magnitude of the induced harmonic current component.

36. An apparatus according to claim 35, wherein the selective harmonic current inducing voltage regulator circuit comprises a current control circuit that controls the current delivered by the rectifier circuit responsive to a current reference signal.

37. An apparatus according to claim 35, wherein the selective harmonic current inducing voltage regulator circuit controls at least one of the phase and the magnitude of the induced harmonic current responsive to a control signal.

38. An apparatus according to claim 35, wherein the selective harmonic current inducing voltage regulator circuit controls the phase and magnitude of the induced harmonic current component such that a selected harmonic current at the AC input port is suppressed.

39. An uninterruptible power supply apparatus, comprising:
   an AC input port;
   a rectifier circuit, coupled to the AC input port, that produces a rectified DC voltage at a rectifier circuit output form an AC input voltage at the AC input port;
   a selective harmonic current inducting voltage regulator circuit, coupled to the rectifier output, that regulates the rectified DC voltage to produce a regulated DC voltage, that regulates a DC component of a current delivered by the rectifier circuit and that selectively induces a harmonic component in the delivered current;
   an inverter circuit, coupled to the to selective harmonic current inducing voltage regulator circuit, that produces an AC output voltage from the regulated DC voltage; and
   a filter circuit, coupled to the AC input port, that selectively suppresses a first harmonic current at the AC input port, and wherein the selective harmonic current inducing voltage regulator circuit controls the phase and magnitude of the induced harmonic current component such that a second harmonic current at the AC input port is suppressed.

40. An apparatus according to claim 39, wherein the rectifier circuit comprises a three-phase passive rectifier circuit.

41. An apparatus according to claim 40, wherein the selective harmonic current inducing voltage regulator circuit induces a harmonic current component having a frequency that is six times a fundamental frequency of the AC input voltage.

42. An apparatus according to claim 41, wherein the selective harmonic current inducing voltage regulator circuit controls the phase and amplitude of the induced harmonic current component such that a harmonic current at the AC input port having a frequency seven times the fundamental frequency is suppressed.

43. An apparatus according to claim 42, further comprising a filter that selectively suppresses a harmonic current at the AC input port having a frequency five times the fundamental frequency.

44. An apparatus according to claim 39, further comprising an auxiliary power source coupled to the inverter.

45. An uninterruptible power supply apparatus, comprising:
   an AC input port;
   a rectifier circuit, coupled to the AC input port, that produces a rectified DC voltage at a rectifier circuit output form an AC input voltage at a AC input port;
   a selective harmonic current inducing voltage regulator circuit, coupled to the rectifier output, that regulates the rectified DC voltage to produce a regulated DC voltage, that regulated a DC component of a current delivered by the rectifier circuit and that selectively induces a harmonic component in the delivered current; and
   an inverter circuit, coupled to the to selective harmonic current inducing voltage regulator circuit, that produces an AC output voltage from the regulated C voltage;
   wherein the selective harmonic current inducing voltage regulator circuit controls a phase and a magnitude of the induced harmonic current component;
   wherein the selective harmonic current inducing voltage regulator circuit comprises a current control circuit that controls the current delivered by the rectifier circuit responsive to a current reference signal; and
   wherein the selective harmonic current inducing voltage regulator circuit further comprises:
      a first current reference signal generating circuit that generates a first current reference signal that commands a DC current component for the current delivered by the rectifier circuit;
      a second current reference signal generating circuit that generates a second current reference signal that commands a harmonic current component for the current delivered by the rectifier circuit; and
      a combining circuit that combines the first and second reference current signals to generate a third current reference signal; and
   wherein the current control circuit is responsive to the third reference current signal.

46. An apparatus according to claim 45, wherein the second current reference signal generating circuit comprises:
   a reference signal generating circuit, coupled to the AC input port, that generates a reference signal that is synchronized to the AC input voltage; and
   a phase and magnitude control circuit that generates the second current reference signal from the reference signal.

47. An apparatus according to claim 46, wherein the reference signal generator comprises:
   a phase locked loop, coupled to the AC input port, that generates a first reference signal that is phase locked to the AC input voltage;
   a frequency multiplier that generates a second reference signal from the first reference signal;
   a phase shifter circuit that produces a third reference signal from the second reference signal, the third reference signal phase shifted with respect to the second reference signal; and
   a variable gain circuit that produces the current reference signal from the third reference signal such that the magnitude of the current reference signal varies responsive to a control signal applied to the variable gain circuit.

48. A method of operating a rectifier circuit that produces a DC voltage at a rectifier circuit output from an AC voltage applied to an input of the rectifier circuit, the method comprising:
   selectively inducing a harmonic component in a current delivered to a load from the rectifier circuit output to suppress a selected harmonic input current at the input of the rectifier without requiring a current bypass between a source of the AC voltage applied to the input of the rectifier circuit and the rectifier circuit output.

49. A method according to claim 48, wherein selectively inducing a harmonic component comprises controlling at least one of the magnitude and phase of the induced harmonic component.

50. A method of operating a rectifier circuit that produces a DC voltage at a rectifier circuit output from an AC voltage applied to an input of the rectifier circuit, the method comprising:

selectively inducing a harmonic component in a current delivered to a load from the rectifier circuit output to suppress a selected harmonic input current at the input of the rectifier; and filtering a first harmonic current at the rectifier circuit input, wherein selectively inducing a harmonic component comprises the step of controlling at lease one of th magnitude and phase of the induced harmonic component to suppress a second harmonic current at the rectifier circuit input.

51. A method according to claim 50, wherein selectively inducing a harmonic component comprises the step of regulating a DC component of the current delivered to the load.

52. A method according to claim 50, wherein the rectifier circuit comprises a three-phase passive rectifier circuit, and wherein selectively inducing a harmonic component comprises the step of inducing a harmonic current having a frequency that is six times a fundamental frequency of the AC input voltage.

53. A method according to claim 52, wherein selectively inducing a harmonic component comprises controlling the magnitude and phase of the induced sixth harmonic current such that a seventh harmonic input current at the rectifier circuit input is suppressed.

54. A method according to claim 53, further comprising filtering a fifth harmonic input current having a frequency five time the fundamental frequency at the rectifier circuit input.

55. A power supply apparatus, comprising:

an AC input port;

a rectifier circuit, coupled to the AC input port, that produces a DC voltage at a rectifier circuit output from an AC input voltage at the AC input port; and a selective harmonic current inducing circuit, coupled to the rectifier circuit output, that induces a sixth order harmonic component in a current delivered to a load from the rectifier circuit output such that a harmonic current at the AC input port is suppressed.

56. An apparatus according to claim 55, wherein the selective harmonic current inducing circuit induces the sixth order harmonic component such that a seventh or higher order harmonic current at the AC input port is suppressed.

57. An apparatus according to claim 55, wherein the selective harmonic current inducing circuit controls the phase and amplitude of the induced sixth order harmonic current such that the harmonic current at the AC input port is suppressed.

58. An apparatus according to claim 55, further comprising a fifth order harmonic filter coupled to the AC input port that selectively suppresses a fifth order harmonic current at the AC input port.

59. An apparatus according to claim 55, wherein the selective harmonic current inducing circuit comprises a selective harmonic inducting current regulator circuit that induces the sixth order harmonic component of the current delivered to the load and the regulates a DC component of the current delivered to the load.

60. An apparatus according to claim 55, wherein the rectifier circuit comprises a three-phase rectifier circuit.

61. An apparatus according to claim 55, wherein the rectifier circuit comprises a passive three-phase circuit.

* * * * *

UNITED STATES PATENT AND TRADEMARK OFFICE
CERTIFICATE OF CORRECTION

PATENT NO. : 6,295,216 B1
DATED : September 25, 2001
INVENTOR(S) : Faria et al.

It is certified that error appears in the above-identified patent and that said Letters Patent is hereby corrected as shown below:

Column 10,
Line 67, following "times" insert -- a --.

Column 11,
Line 23, following "current" insert -- regulator circuit, coupled to the rectifier output, that regulates a DC component of a current --.

Column 12,
Line 55, please change ";" to -- . --.

Column 13,
Lines 17 and 61, please change "form" to -- from --.
Line 61, please change "a" to -- the --.
Line 65, please change "regulated" to -- regulates --.

Column 14,
Line 3, please change "regulated C" to -- regulated DC --.

Column 15,
Line 7, please change "lease" to -- least --.

Signed and Sealed this

Fourth Day of May, 2004

JON W. DUDAS
*Acting Director of the United States Patent and Trademark Office*